United States Patent [19]
Dick

[11] Patent Number: 6,073,154
[45] Date of Patent: Jun. 6, 2000

[54] COMPUTING MULTIDIMENSIONAL DFTS IN FPGA

[75] Inventor: Christopher H. Dick, San Jose, Calif.

[73] Assignee: Xilinx, Inc., San Jose, Calif.

[21] Appl. No.: 09/105,072

[22] Filed: Jun. 26, 1998

[51] Int. Cl.[7] .................................................. G06F 17/14
[52] U.S. Cl. ........................................................ 708/401
[58] Field of Search ................................... 708/401, 403, 708/405

[56] References Cited

U.S. PATENT DOCUMENTS

| | | | |
|---|---|---|---|
| 3,952,186 | 4/1976 | Speiser et al. | 708/401 |
| 4,060,850 | 11/1977 | Speiser | 708/401 |
| 4,328,555 | 5/1982 | Nussbaumer | 708/401 |

OTHER PUBLICATIONS

Quandalle, "Multidimensional Discrete Fourier Transform Calculated Through Polynomial Transform", IBM Technical Disclosure Bulletin, vol. 21, No. 7, Dec. 1978, pp. 2859–2861.

James W. Cooley and John W. Tukey, in "An Algorithm for the Machine Calculation of Complex Fourier Series", Math of Comput., vol. 19, pp. 297–301, Apr. 1965.

H. J. Nussbaumer and P. Quandelle, in "Computation of Convolutions and Discrete Fourier Transforms by Polynomial Transforms", J. Res. Develop., vol. 22, No. 2, pp. 134–144, Mar. 1978.

Kai Hwang, in Computer Arithmetic Principles Architecture and Design, John Wiley & Sons, New York, 1979, Chapter 5, pp. 152–155.

*Primary Examiner*—Tan V. Mai
*Attorney, Agent, or Firm*—Edel M. Young

[57] ABSTRACT

An FPGA configured for computation of an N×N discrete Fourier transform (DFT) using polynomial transforms defined in modified rings of transforms, comprising a first buffer for ordering a set of polynomial data in a two dimensional matrix, a multiplier for multiplying each element of the two dimensional matrix by $\omega^{-n_2}$ (where $\omega = e^{-j\pi/N}$, e is a constant ($\ln(e)=1$), $j=\sqrt{-1}$, $n_2$=the column index number in the matrix, and N=the transform length) to produce a premultiplication product, a polynomial transform circuit for performing a polynomial transform (PT) modulo ($z^N+1$), size N, root $z^2$ on the premultiplication product to produce a polynomial transform result, where z represents the unit delay operator, a reduced DFT calculator for performing N reduced DFTs of N terms on the polynomial transform result to produce a permuted output, and an address generator for reordering the permuted output to a natural order.

10 Claims, 5 Drawing Sheets

$\triangle z^n$ = POLYNOMIAL MULTIPLICATION BY $z^n$ MODULO $z^n + 1$

Radix-2 polynomial transform
decimation-in-frequency
butterfly

Radix-2 polynomial transform butterfly

COMPUTING MULTIDIMENSIONAL DFTS IN FPGA

FIELD OF THE INVENTION

The present invention relates generally to the field of FPGAs and, more particularly, to a method for computation of multidimensional discrete Fourier transforms using a field programmable gate array (FPGA).

BACKGROUND OF THE INVENTION

The use of FPGAs for carrying out high speed arithmetic computations has gained recognition in recent years. FPGA architectures including logic blocks having multiple look-up-table function generators, such as the XC4000™ family of devices from XILINX, Inc., the assignee of the present invention, are particularly suited for such computations. However, many of the important DSP algorithms are multiply-intensive, and even FPGAs having the largest number of logic blocks normally can't embed the multiplier circuits and the attendant control and support circuits in a single chip. It becomes incumbent on the designer to choose efficient DSP algorithms and to realize them with efficient circuit designs. The fast Fourier transform (FFT) is an outstanding example of an efficient DSP algorithm and distributed arithmetic is a well established design approach that replaces gate-consuming array multipliers with efficient shift and add equivalent circuits that offer comparable performance.

The discrete Fourier transform (DFT) of a sampled time series is closely related to the Fourier transform of the continuous waveform from which the time samples were taken. The FFT is a highly efficient procedure for computing the DFT of a time series and was reported by Cooley and Tukey in 1965 ("AN ALGORITHM FOR THE MACHINE CALCULATION OF COMPLEX FOURIER SERIES" by J. W. Cooley and J. W. Tukey, Math of Comput., Vol. 19, pp. 297–301, April 1965). The highly space-efficient implementation of a radix-2 circuit, illustrated and described in co-pending U.S. patent application Ser. Nos. 08/815,019 and 08/937,977 (filed on Sep. 26, 1997), both assigned to the assignee of the present invention and incorporated herein by reference, allows for the implementation of complex FFT circuitry in a single programmable logic device.

The DFT is one of the core algorithms used in many signal processing applications. Its efficient computation is therefore of paramount importance. Higher dimensional, i.e. multi-dimensional (M-D) transforms are also of great interest in many systems. A commonly used implementation approach employs software programmable VLSI DSPs. However, significant performance gains can be attained using an alternative technology like the Xilinx XC4000™ series field programmable gate arrays (FPGAs).

Conventional approaches, e.g. using the Cooley-Tukey (CT) algorithm, suffer from inefficiencies associated with exploiting the transform separability and decomposing the calculation into a sequence of 1-D problems. Shown in FIG. 1 is an example of an apparatus 10 for computing the 2-D DFTs using conventional processing. Data in a matrix form is input into a first RAM buffer 12. A first processor 14 using a first FFT (FFT1) reads out the input data from the buffer 12, computes the row transforms and outputs the result to a first bank of a second buffer 16. At the same time, a second processor 18 using a second FFT (FFT2) reads out the previous FFT1 transformed data from a second bank of buffer 16 and computes the column transforms and outputs the result to a third buffer 20 where an output can be taken. This technique involves a great deal of row and column processing of data matrices, which is multiplication intensive. However, performing multiplication operations using FPGAs consumes FPGA resources and is optimally to be avoided.

SUMMARY OF THE INVENTION

The inefficiencies of prior art methods for implementing DFT computations using FPGAs is overcome by the present invention of a method and apparatus using FPGAs for computing multidimensional DFTs based on arithmetic in polynomial fields. According to the invention, an FPGA is configured for computation of an N×N discrete Fourier transform (DFT) using polynomial transforms defined in modified rings of polynomials, and comprises the following elements:

(a) a first buffer for ordering a set of polynomial data in a two dimensional matrix, (b) a multiplier for multiplying each element of the two dimensional matrix by $\omega^{-n_2}$ (where $\omega = e^{-j\pi/N}$, e is a constant ($\ln(e)=1$, where "ln" indicates the natural logarithm), $j=\sqrt{-1}$, $n_2$=the column index number in the matrix, and N=the transform length) to produce a premultiplication product, (c) a polynomial transform circuit for performing a polynomial transform (PT) modulo ($z^N+1$), size N, root $z^2$ of the premultiplied data product to produce a polynomial transform result, where z represents the unit delay operator, (d) a reduced DFT calculator for performing N reduced DFTs of N terms on the polynomial transform result to produce a permuted output, and (e) an address generator for reordering the permuted output to a natural order.

The technique is inherently multidimensional. Polynomial transforms (PT) are used to map multidimensional DFTs into one-dimensional DFTs. This mapping is very efficient because it is accomplished using ordinary arithmetic without multiplications, and because it can be implemented by FFT-type algorithms when the dimensions are composite. The multiplication-free aspect of the mapping is of particular interest for FPGA implementation: multipliers consume large amounts of logic in comparison to adders that can be realized with a modest amount of FPGA resources.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings.

FIG. 7b is a more detailed diagram of the FPT/FFT virtual node architecture of any of the virtual processors VXn depicted in FIG. 7a.

DETAILED DESCRIPTION OF THE PREFERRED EMBODIMENTS

Figure 1:
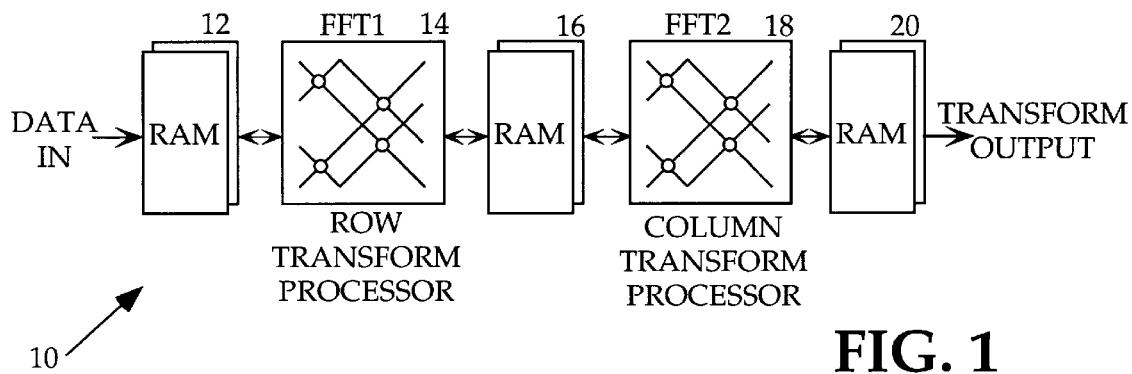
FIG. 1 is a block diagram of a conventional row-column type of apparatus for computing a 2-D DFT using two FFT processors.

FPGA-based digital signal processing (DSP) offers the DSP system designer a new means of implementing data paths that are highly optimized for a particular algorithm. The approach taken by the present invention maintains the high-performance advantages of dedicated hardware solutions, but with the flexibility of software. Obtaining the potential performance rewards using FPGA-based DSP often requires a lateral approach to system design because the solution employed by a DSP engineer using software programmable very large scale integration (VLSI) DSPs is usually not directly appropriate for an FPGA-based solution. The multi-dimensional FFT processor utilized by the present invention is a case in point. By combining knowledge of fast algorithms, computer arithmetic and FPGA device architecture, FPGA-based DSP can exploit the reduced computational requirements of procedures whose computational advantage may not be realized with software DSP solutions.

In the case of the PT FFT, modulo arithmetic as well as awkward data access patterns make this computation unsuitable for high-performance software DSP processors. These considerations are not an issue with the FPGA architecture. Functional units as well as address sequencers optimized for the algorithm can be easily synthesized. By using polynomial transforms, an FPGA 2-D FFT processor according to the present invention requires approximately half of the logic resources of an FPGA design employing conventional row-column processing.

As the dimensionality d of the problem increases, the savings in FPGA resources, in comparison to a row-column processor, increase approximately in proportion to d. For example, with a 3-D problem, the PT architecture uses only 33% of the configurable logic blocks that a row-column processor with the same throughput requires. H. J. Nussbaumer and P. Quandelle, in "Computation of Convolutions and Discrete Fourier Transforms by Polynomial Transforms", J. Res. Develop., Vol. 22, No. 2, pp. 134–144, March 1978, describe a technique for computing power-of-2 DFTs based on roots of unity in fields of polynomials. A structurally simpler technique based on polynomial transforms defined in modified rings of polynomials is also described. Although this latter method is not the most computationally efficient of the polynomial transform based methods for computing DFTs, its operation count is lower than that of the conventional row-column approach often used for computing 2-D transforms. The combination of structural simplicity and reduced operations count make the algorithm well suited for FPGA implementation. The algorithm 22 is summarized in FIG. 2.

Polynomial data is input to a first operation 24 and put in a 2-D matrix form. In the second step 26, the data undergoes $N^2$ premultiplications to produce a phase rotation of every element in the matrix by the factor of $\omega^{-n_2}$ (where $\omega = e^{-j\pi/N}$, is a constant ($\ln(e)=1$), $j=\sqrt{-1}$, $n_2$=the column index number in the matrix, and N=the transform length).

Figure 3:
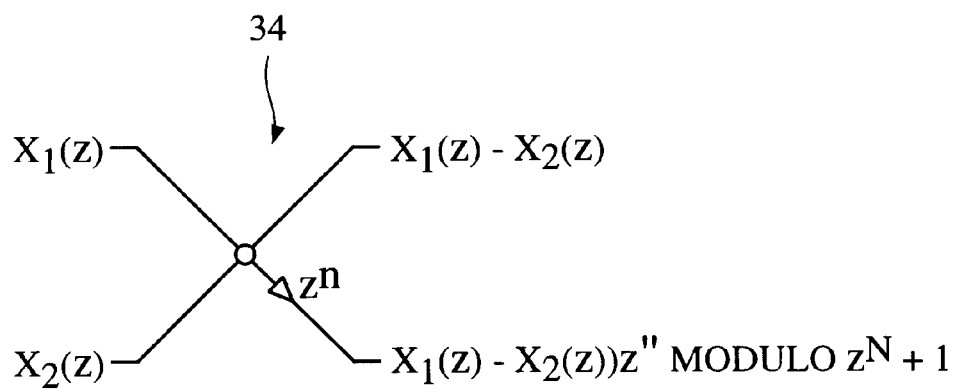
FIG. 3 is diagram of a radix-2 polynomial transform decimation-in-frequency butterfly.
Figure 4:
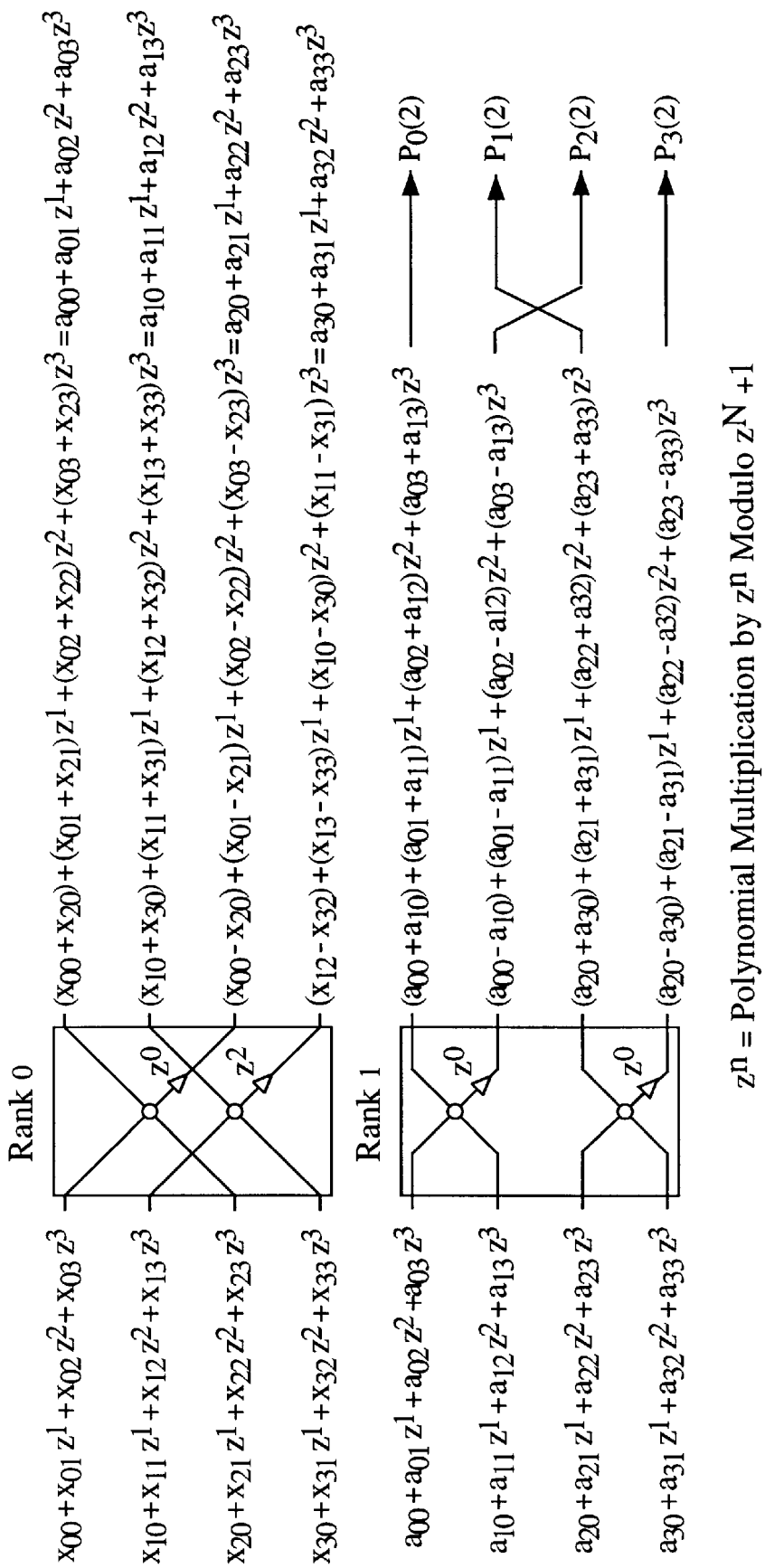
FIG. 4 is a diagram illustrating a fast polynomial transform algorithm for the case N=4.

The result of the operation in the premultiplication step 26 is supplied to the next step 28 where the data is processed using only a minimum number of additions and subtractions. This operation uses a radix-2 polynomial transform decimation-in-time (DIT) or decimation-in-frequency (DIF) butterfly, where the polynomial transform is of length N and kernel $z^2$. The term z represents the unit delay operator. This algorithm is referred to as a fast polynomial transform (FPT) algorithm. The signal flow graph for the DIF polynomial transform butterfly 34 is shown in FIG. 3. Here a DIF FFT-type partition with a $z^2$ transform kernel is used to compute a polynomial transform. An example illustrating the computation of a polynomial transform for N=4 is shown in FIG. 4. In FIG. 4, each Rank (Rank 0, Rank 1) has two butterflies. The output of Rank 0 appears at the top, right-hand side of the figure and also appears as the input (at the bottom left-hand side of the figure) to the input of Rank 1. The input polynomials are in-order while the result, $P_0(z)$, $P_1(z)$, $P_2(z)$ and $P_3(z)$ output by Rank 1, is produced in bit-reversed order and needs to be re-ordered.

It is important to note that instead of multiplications by powers of roots of unity, as used in the radix-2 Cooley-Tukey FFT algorithm, the polynomial transform butterflies of Rank 0 and Rank 1 use multiplications modulo $(z^N+1)$ by powers of z. These amount to simple polynomial rotations followed by sign inversion of the overflow words, and are therefore implemented in FPGAs without any multiplication operations.

Each polynomial in the calculation consists of N terms. Each polynomial coefficient is complex valued because of the complex input premultiplications. The calculation in each arm of the butterfly therefore requires 2N additions. There are N/2 butterflies in each of $\log_2 N$ processing ranks giving the total number of additions as $2N^2 \log_2 N$.

The final output of the PT operation 28 is four polynomials $P_0(z)$, $P_1(z)$, $P_2(z)$ and $P_3(z)$. In step 30 a sequence of N 1-D FFT-like calculations are performed on each column of an array of the polynomials. These FFT-like calculations are formally referred to as reduced DFTs. They have exactly the same signal flow graph and arithmetic complexity as an FFT.

The result of the operation 30 of N reduced DFT of N terms is data which is in permuted order. To make use of that data in subsequent processing steps it is necessary to restore the natural order of the original matrix. An address generator unit, which is easily constructed in an FPGA, is used in a reordering operation 32. No arithmetic is involved; merely a reshuffling of the data.

Figure 2:
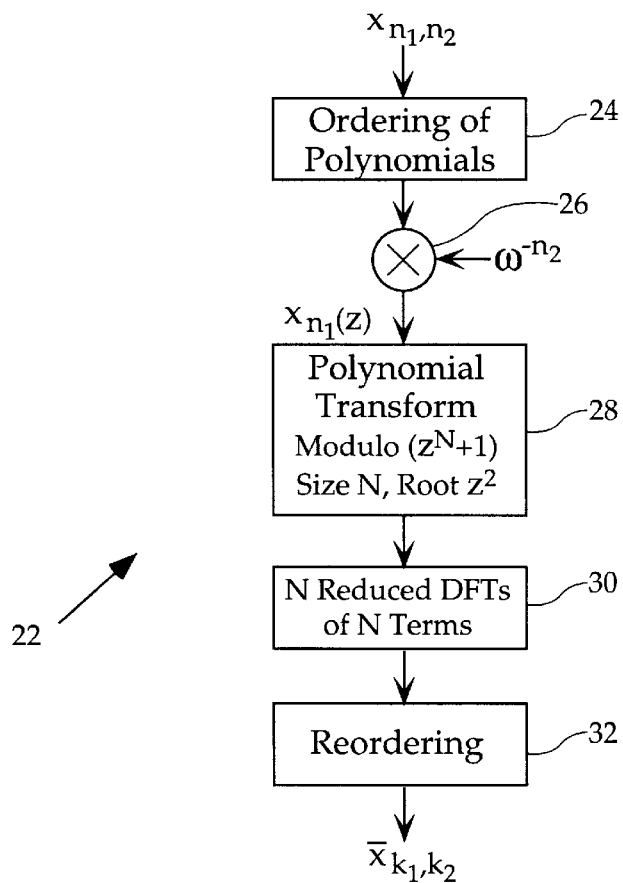
FIG. 2 is an algorithm used by the invention for computing an N×N DFT using polynomial transforms defined in modified rings of polynomials.
Figure 5:
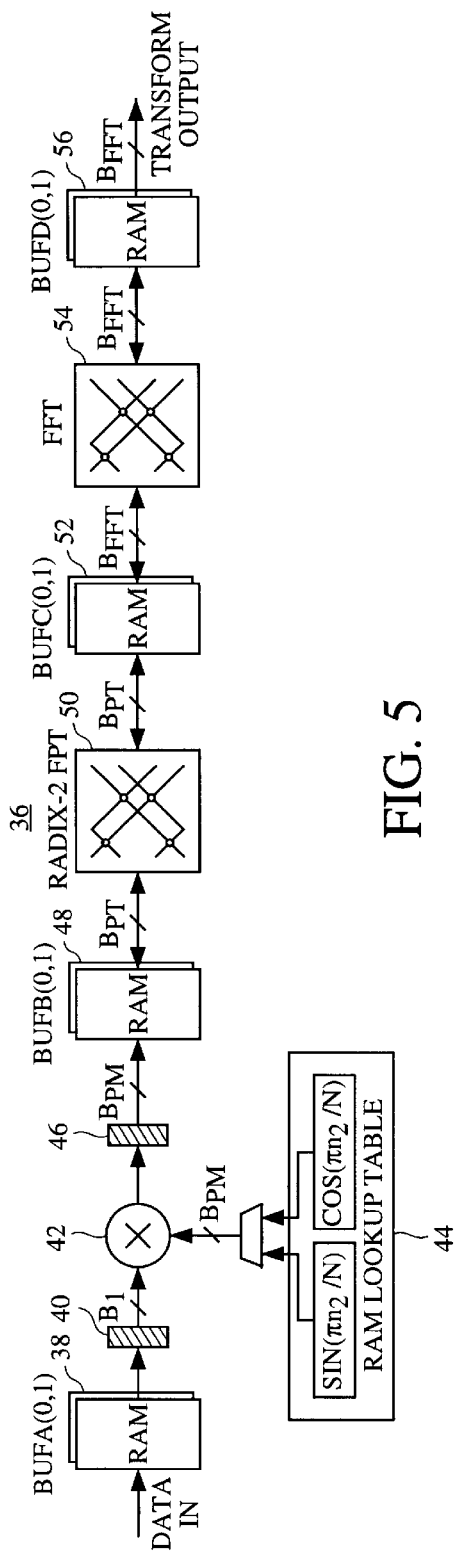
FIG. 5 is a block diagram of a polynomial transform DFT processor FPGA architecture according to a first embodiment of the invention.

The polynomial transform DFT processor FPGA architecture 36 shown in FIG. 5 implements the algorithm 22 shown in FIG. 2. The input data is first loaded into a buffer 38 and arranged in an array or matrix form. This corresponds to the ordering step 24 of the algorithm 22 shown in FIG. 2. The ordered data set i is latched by a latch 40 and then supplied to a multiplier 42 which corresponds to the premultiplication step 26 of FIG. 2. Pipelining at the data-set level is used to maximize the system performance. The premultiplications for data set i performed in the multiplier 42 use complex constants ($\sin(\pi n_2/N)$; $\cos(\pi n_2/N)$) stored in a RAM lookup table 44. It should be noted that:

$$\omega^{-n_2} = (e^{-j\pi/N})^{-n_2} = (\cos(2\pi(-n_2)/N) - j \sin(2\pi(-n_2)/N)).$$

The product of the multiplier 42 is latched into a latch 46. From the latch 46 the data is supplied to another buffer 48. Simultaneously with the ordering operation in buffer 38 and the premultiplication operation by the multiplier 42, a data set (i−1) is read out from another bank of buffer 48 and the polynomial transform of the data set i−1 is computed in a radix-2 FPT 50. This corresponds to the PT step 28 of FIG. 2. The result of the radix-2 FPT operation is stored in a third buffer 52.

Concurrently with the operations in the buffer 38, the multiplier 42, and the radix-2 FPT 50, N FFTs are computed on a polynomial transform output, data set i−2, read out from the buffer 52. The dual memory banks of each of the buffers 38, 48, 52 and 56 provide the necessary buffering to permit the full pipelining of each processing stage. The buffers 48, 52 and 56 are so-called ping-pong buffers which allow writing of data to one bank while data is read out of the other bank. Note that, during processing, the previously computed result is read out from the buffers 48, 52, and 56 while new results are written into the ping-pong buffers, as indicated by the doubled headed arrows.

The most complicated memory management task is associated with the polynomial transform calculation. At the start of an FPT calculation the premultiplied input data is in buffer 48. As the polynomial butterflies are computed by the radix-2-FPT 50 the results are written to buffer 52. After the first rank (e.g., Rank 0) of polynomial butterflies are completed, this intermediate result will be held entirely in buffer 52. The original input data in buffer 48 is no longer needed. For the next rank of butterflies (e.g., Rank 1) the input and output bus of the polynomial transform butterfly core are swapped and data is read from buffer 52, processed, and the results written to buffer 48. The data-bus swapping is implemented using tristate busses within the FPGA. The memory swapping continues until all of the butterfly ranks have been computed. A similar memory management strategy is used with buffers 52 and 56 to handle the FFT calculations.

Assuming real-valued input data, for example an image frame, each premultiplication by the multiplier 42 is the product of a real-number with a complex number and requires 2 real multiplications and no additions. Fast multipliers, such as array multipliers are expensive functional units to implement using FPGAs. The design used here is a radix-3 Booth recoded serial-parallel multiplier 42. For a description of a radix-3 Booth recoded serial-parallel multiplier, see Kai Hwang, *Computer Arithmetic Principles Architecture and Design*, Chapter 5, pp. 152–155 John Wiley & Sons, New York, 1979. For a B-bit multiplicand and multiplier, B/2 clock cycles are required to form a two's complement product. Only the most significant B-bits of the 2B-bit result are retained. A 16×10 bit multiplier occupies 48 Xilinx model XC4000υ series configurable logic blocks (CLBs), while an 18 ×18 bit unit occupies 52 CLBs. Not all of the flip-flops in occupied CLBs are used. When the multiplier is incorporated into a larger design, data registers can be merged into the unused locations to give better device utilization.

The two real multiplications needed for each premultiplication are implemented with one time-division multiplexed multiplier 42. The time $T_{PM}$ required for the execution of $N^2$ premultiplications is:

$$T_{PM} = \frac{BN^2}{f} \text{ seconds} \qquad (1)$$

where f is the system clock frequency.

Figure 6:
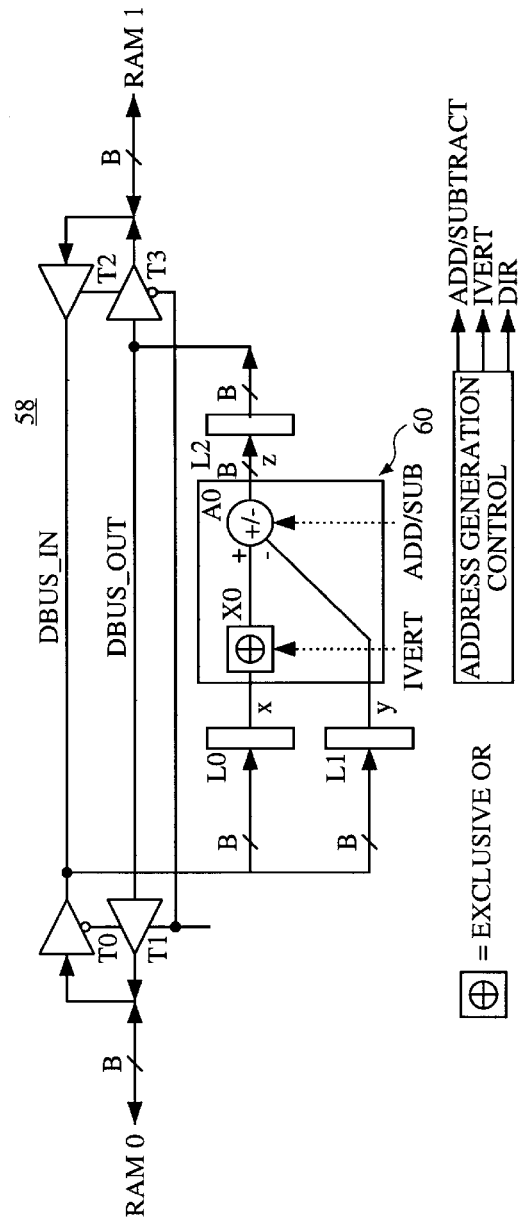
FIG. 6 is a block diagram of the hardware implementation of the radix-2 polynomial butterfly shown in FIG. 3.

The architecture 58 of the polynomial transform butterfly 34 is shown in FIG. 6. Referring now to FIG. 6, the functional unit U0 computes the result z depending on the control signals IVERT and ADD/SUB. A total of three operations are provided by U0 as defined by Eq. (2).

$$z = \begin{cases} x+y & \text{when } IVERT = 0 \text{ and } ADD/SUB = 0 \\ x-y & \text{when } IVERT = 0 \text{ and } ADD/SUB = 1 \\ y-x & \text{when } IVERT = 1 \text{ and } ADD/SUB = 1 \end{cases} \qquad (2)$$

The design is fully pipelined so that data fetches, stores and calculations are overlapped. The only arithmetic functions required are addition and subtraction. These operations occupy only a small amount of FPGA logic resources.

The input data is initially in memory bank RAM 0. Each butterfly in the polynomial transform signal flowgraph is computed sequentially. As noted above, the processing is performed in a pipelined fashion. While data is loaded from memory into the latches L0 and L1, the adder/subtractor A0 is operating on the previously fetched input data. Simultaneously with these operations, the previously computed result, held in latch L2, is written to memory bank RAM 1. Processing continues in this manner until all of the N/2 butterflies in the current butterfly rank are computed. At this stage an intermediate result is held in RAM 1 and there are still further $\log_2(N)-1$ butterfly ranks to be computed. For the next stage of processing, inputs are fetched from RAM 1, processed, and written to RAM 0. The direction of flow through the processing core is then reversed again, data being read from RAM 0, processed, and written to RAM 1. The computation proceeds in this manner until all of the $\log_2(N)$ butterfly ranks have been calculated. The tristate buffers T0, T1, T2 and T3 control the direction of data-flow through the system.

The polynomial butterfly is very compact. Assume a data path width of B bits. The latch L0 and array of exclusive-OR gates X0 occupy B/2+1 CLBs. Similarly, the adder/subtractor A0 and latch L2 occupy B/2+1 CLBs, and L1 requires B/2 CLBs. The tristate buffers T0, T1, T2 and T3 have not been included in the logic count since they are implemented using Xilinx 4000 series TBUFs and so do not consume any CLB resources. A sum or difference of the complex input data is computed in 2 clock cycles—the real and imaginary parts being handled separately. The execution time $T_{PT}$ for the polynomial transform is:

$$T_{PT} = \frac{2N^2 \log_2 N}{f} \text{ seconds} \qquad (2a)$$

The polynomial transform arithmetic core occupies 27 Xilinx model XC4000™ series CLBs. In addition to the processing core, a complete polynomial transform engine requires a memory address generator which occupies another 40 CLBs.

The final stage 54 of the calculation reads data out of the buffer 52 and performs an operation corresponding to the operation 30 of FIG. 2, i.e., a sequence of N N-point reduced DFTs. These are performed on each column of an array of polynomials read out from buffer 52. These DFTs can be calculated using a radix-2 Cooley-Tukey FFT partitioning with modified phase factors. The algorithm used is based on the DIT radix-2 butterfly. The multiplication by the complex phase factor, $\omega^k_N$, is implemented using four real multiplications and two real additions. Two complex additions are required to form the final butterfly output. Each complex addition is implemented with two real additions. An 18-bit fractional fixed-point representation is used for each of the real and imaginary components of a complex number. The phase factors, $\omega^k_N$, are kept to a precision of 16 bits. The complex product engine for computing $y\omega_N^k$ is based on the Booth recoded multiplier outlined earlier. Four multipliers (not shown) operating in parallel are used for the complex multiplication. A subtractor and adder (not shown) are used to combine the multiplier outputs to form the final product. Each multiplier produces a result in eight clock cycles. The butterfly design is pipelined to allow uninterrupted processing. Data fetches, stores, the complex multiplication, the sum $(x+y\omega_N^k)$, and difference $(x-y\omega_N^k)$ calculations are overlapped. One complete butterfly is completed every 8 clock cycles.

The pipelined processing offsets the time-penalty of the slow serial-parallel multipliers used in the design. The time to perform 1 DFT is $B_\omega N/4\log_2 N/f$ seconds. The execution time $T_{FFT}$ for all N FFTs is:

$$T_{FFT} = \frac{B_\omega N^2 \log_2 N}{4f} \quad (3)$$

The butterfly unit occupies 330 Xilinx XC4000™ series CLBs. As highlighted earlier, there are unused flip-flops in the multiplier layout. A dense placement was achieved by merging butterfly pipeline registers into these locations.

The result of the N reduced DFT of N terms is data which is in permuted order. As part of the operation 54, the data is reordered, corresponding to the step 32 of FIG. 2, and written to a fourth buffer 56 from which the transform output may be read.

In addition to the butterfly processor, data input, output, and phase factor memory address generators are required. In the current system a change of transform size requires re-loading the FPGA. This was done to minimize the overheads associated with a fully programmable address generator. The area that the address units occupy vary with the transform size. For a 512-point transform, 134 CLBs are required for the address generators. So a complete 512-point FFT processor occupies 428 XC4000™ series CLBs.

What advantages have been achieved by implementing a 2-D DFT using the polynomial transform method? First consider a comparison between the polynomial transform technique and an architecture that computes 2-D DFTs using the conventional row-column approach with the same FFT butterfly processor that is used in the polynomial transform implementation. In the polynomial transform design the premultiplications and the polynomial transform calculation are overlapped with the FFT processing. Only N FFTs are required as opposed to 2N FFTs using the row-column technique. Using this comparison the polynomial transform method is faster by a factor of two.

However, this comparison is not entirely fair, because the polynomial transform FFT processor uses more hardware (more CLBs) than a row-column processing architecture based on a single butterfly core. Here is another way to do the comparison. First consider the conventional CT approach architecture for computing 2-D DFTs shown in FIG. 1. The processing throughput of this system is the same as that of the polynomial transform based architecture in FIG. 5. Now consider the amount of hardware used in the two architectures. The polynomial transform main processing core occupies 27 CLBs, and requires another 50 CLBs for the memory address generator for a 512-point transform, giving a total of 77 CLBs for a complete polynomial transform processing unit. The premultiplication stage requires 48 CLBs. The FFT processor, including the address generators for 512-point FFTs requires 428 CLBs. The total CLB count for the polynomial transform based system of FIG. 5 is 553 CLBs. The CLB count for the architecture in FIG. 1 is 856 CLBs. The two systems have equivalent throughput, however the polynomial transform based architecture uses 553/856×100=64% of the hardware resources of the row-column processor. So the polynomial transform architecture provides a reasonably large hardware savings over the conventional row-column processing system.

The transform rate is determined by the slowest pipeline stage, which is the stage doing the FFT computations. The system clock speed estimated by a timing analyzer is 32 MHz for a 3 ns FPGA. Using 18-bit arithmetic with a 512×512-pixel image (N=512), a transform is completed every 147 ms. This means 6.8 frames can be processed per second. In terms of CLB count, the FPT DFT processor can be accommodated in a single high-density Xilinx XC4000™ series FPGA.

Figure 7A:
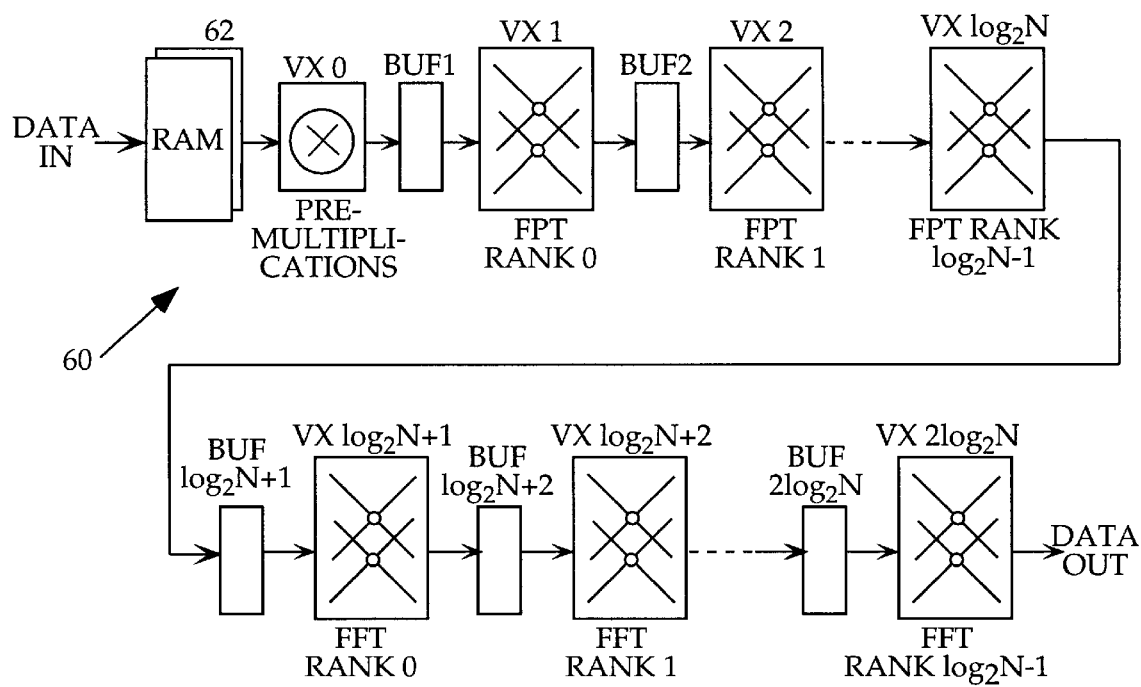
FIG. 7a is a block diagram of a multi-FPGA apparatus according to the invention for computing 2-D DFTs based on polynomial transforms.
Figure 7B:
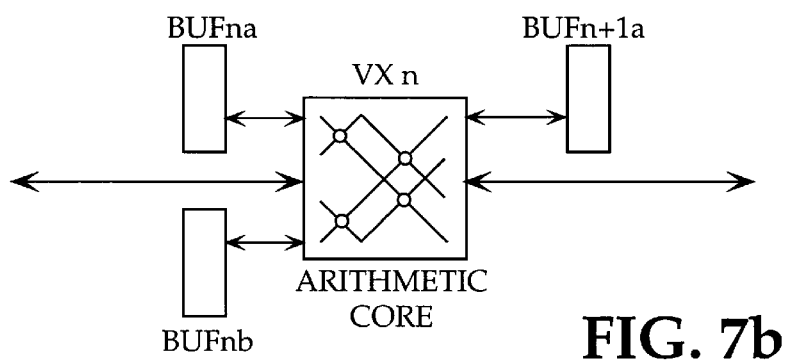

A virtual parallel processor (VPP) architecture that exploits parallelism of the polynomial transform DFT algorithm will increase the system throughput. The parallel processing approach is based on duplication of the FPT and FFT butterfly functional units. Unique FPT and FFT butterfly processors are used for each rank of the FPT and FFT processes respectively. Illustrated in FIGS. 7a and 7b is a multi-FPGA architecture 60 for computing 2-D DFTs based on polynomial transforms. An FPGA virtual processor is used for each processing stage of the FPT and FFT. The input premultiplications are also allocated to a separate virtual processor. FIG. 7b shows in more detail the FPT/FFT virtual node architecture of one of the virtual processors VXn shown in FIG. 7a. Three banks of memory are shown, represented by buffers BUFna and BUFnb, and BUFn+1a. These may be internal to the FPGA device or external, depending on the problem size N and the density of the particular FPGA device being considered.

The polynomial data are ordered in a RAM buffer 62 after which the data is read out of the buffer 62, corresponding to step 24 of FIG. 2. The algorithm is partitioned and mapped onto a set of $\log_2 N+1$ virtual processors (VP) VX 0, VX 1, VX 2, . . . , VX 2 $\log_2 N$, each connected in series with the other processors through separate double buffers BUF1, BUF2, . . . BUF $2\log_2 N$, respectively. For the partitioning shown in FIG. 7a, virtual processor VX 0 performs the input premultiplications corresponding to step 26 of the algorithm 22, while virtual processors VX 1 to VX $\log_2 N$ perform the FPT butterfly ranks 0, . . . ,$\log_2-1$, respectively. Each of these virtual processors implements one polynomial butterfly that is time division multiplexed to compute the N/2 polynomial butterflies in a processing rank of the FPT. Similarly, virtual processors VX $\log_2 N+1$ to VX 2 $\log_2 N$ each compute one of the $\log_2 N$ butterfly ranks of the FFT algorithm. Each of these virtual processors is a radix-2 FFT butterfly that is time division multiplexed over the N/2 butterflies in a single processing stage of the FFT.

Closer observation reveals that a physical FPT butterfly processor can be time division multiplexed over multiple virtual FFT butterfly processors. Three physical FPT butterfly units are sufficient for this design. The CLB count is $$C_{PTFFT} = C_{PM} + 3C_{PT} + C_{FFT}\log_2 N,$$

where $C_{PM}$, $C_{PT}$ and $C_{FFT}$ are the CLB counts for the premultiplication stage multiplier, PT butterfly and FFT butterfly respectively.

For a parallelized row-column technique to achieve the same processing throughput as the parallel PT approach, separate row and column processors are required. Each of these would consist of an FFT butterfly module for each of the 2 $\log_2 N$ processing ranks. The CLB count is $C_{RC} = C_{FT}\log_2 N$. For N=512, $C_{PTFFT}$=4123 and $C_{RC}$=7704. The two approaches produce the same transform throughput but the parallel PT architecture uses 54% of the logic resources of the parallel row-column implementation.

In terms of the number of FPGAs, the logic requirements for the PT architecture is equivalent to approximately four Xilinx 25,000 gate model XC4025 devices. The system clock rate is 38.5 MHz. The transform execution times for N=256 to 2048 are shown in Table 1 below.

TABLE 1

2-D FFF execution times for the VPP

| FFF Size | Time (ms) - T |
|---|---|
| 256 × 256 | 6.81 |
| 512 × 512 | 27.24 |
| 1024 × 1024 | 108.94 |
| 2048 × 2048 | 435.772 |

While this specification mainly describes two-dimensional polynomial-transform (2-D PT) based DFTs, it is to be understood that multi-dimensional PT-based DFTs are within the scope of the invention. A polynomial transform based approach can be developed to compute DFTs for dimensions greater than 2. Consider a DFT $\overline{X}_{k1,k2,k3}$ of size N×N×N $$\overline{X}_{k1,k2,k3} = \sum_{n_1=0}^{N-1} \sum_{n_2=0}^{N-1} \sum_{n_3=0}^{N-1} X_{n_1,n_2,n_3} \omega^{n_1 k_1} \omega^{n_2 k_2} \omega^{n_3 k_3}$$

$$k_1, k_2, k_3 = 0, K, N-1$$

In polynomial notation this DFT becomes $$\overline{Z}_{k_1,k_2(z)} \equiv \sum_{n_1=0}^{N-1} \sum_{n_2=0}^{N-1} X_{n_1,n_2}(z) \omega^{n_1 k_1} \omega^{n_2 k_2}$$

modulo($z^N$31 1)

$$\overline{X}_{n_1,n_2(z)} = \sum_{n_3=0}^{N-1} X_{n_1,n_2,n_3} z^{n_3}$$

$\overline{X}_{k1,k2,k3} \overline{X}_{k1,k2}(z)$ modulo $(z-\omega^{k_3})$

When N is an odd prime, with N=p, this DFT reduces to a DFT of size p×p for $k_3$=0.

$$\overline{X}_{k_3 k_1, k_3 k_2}(z) \equiv \sum_{n_1=0}^{p-1} \sum_{n_2=0}^{p-1} X^1_{n_1,n_2}(z) z^{n_1 k_1} z^{n_2 k_2}$$

modulo P(z)

$P(z)=(z^p-1)(z-1)$ $X^1_{n_1 n_2}(z) \equiv X_{n_1 n_2}(z)$ modulo P(z)

$\overline{X}_{k_3 k_1, k_3 k_2, k_3} \equiv \overline{X}_{k_3 k_1, k_3 k_2}(z)$ modulo $(z-\omega^{k_3})$ Therefore, the DFT of size p×p×p is mapped by a two-dimensional polynomial transform into a DFT of size p×p plus $p^2$ reduced DFTs of dimension p. For a DFT of dimension d, the same process is applied recursively and the DFT is mapped into one DFT of length p plus $p+p^2+K+p^{d-1}$ odd DFTs of length p. Thus, if $M_1$ is the number of complex multiplications for a DFT of length p, the number of complex multiplications M corresponding to a DFT of dimension d with length p in all dimensions becomes $$M = 1 + (M_1 - 1)(p^d - 1)/(p - 1)$$

The same DFT is computed with $dp^{d-1}M_1$ complex multiplications by the row-column method. Therefore, the number of multiplications is approximately reduced by a factor d when the row-column method is replaced by the polynomial transform approach. Thus, the efficiency of the polynomial transform method, relative to the row-column algorithm, is proportional to d.

In practice then, a 3D DFT is processed by the above described method of applying a polynomial transform with reduced DFTs, and reordering to produce data plus a 2D DFT. The 2D DFT is then processed by the same process of applying a polynomial transform with reduced DFTs, and reordering to produce the final data. A 4D DFT is similarly processed by the above described method (premultiplication, polynomial transform with reduced DFT and reordering processing) to produce data plus a 3D DFT. The 3D DFT is then processed in the same manner as just described, and so forth. Although the present invention has been shown and described with respect to preferred embodiments, various changes and modifications are deemed to lie within the spirit and scope of the invention as claimed.

What is claimed is:

1. A method for computing multidimensional discrete Fourier transforms (DFTs) using a field programmable gate array (FPGA) comprising the steps of:
    a. ordering a set of polynomial data in a two dimensional matrix;
    b. multiplying each element of the two dimensional matrix by $\omega^{-n_2}$ (where $\omega = e^{-j\pi/N}$, e is a constant (ln(e)= 1, where ln indicates the natural logarithm), j=√−1, $n_2$=the column index number in the matrix, and N=the transform length) to produce a premultiplication product;
    c. performing a polynomial transform (PT) on the premultiplication product to produce a polynomial transform result;
    d. performing N reduced DFTs of N terms on the polynomial transform result to produce a permuted output; and
    e. reordering the permuted output to a natural order.

2. A method for computing multidimensional DFTs using an FPGA according to claim 1, wherein the PT recited in step (c) is modulo ($z^N+1$), size N, root $z^2$, where z represents the unit delay operator.

3. A method for computing multidimensional DFTs using an FPGA according to claim 1, wherein steps (a) through (e) are repeated recursively for DFTs that have more than two dimensions.

4. An apparatus for computation of an N×N discrete Fourier transform (DFT) using polynomial transforms defined in modified rings of transforms, comprising:
    a. first buffer means for ordering a set of polynomial data in a two dimensional matrix;
    b. first multiplier means for multiplying each element of the two dimensional matrix by $\omega^{-n_2}$ (where $\omega = e^{-j\pi/N}$, e is a constant (ln(e)=1, where ln indicates the natural logarithm), j=√−1, $n_2$=the column index number in the matrix, and N=the transform length) to produce a premultiplication product;

c. PT means for performing a polynomial transform (PT) modulo ($z^N+1$), size N, root $z^2$ on the premultiplication product to produce a polynomial transform result, where z represents the unit delay operator;

d. reduced DFT means for performing N reduced DFTs of N terms on the polynomial transform result to produce a permuted output; and e. reordering means for reordering the permuted output to a natural order;

wherein the first buffer means, the first multiplier means, the PT means, the reduced DFT means, and the reordering means are embodied in a field programmable gate array (FPGA).

5. An apparatus for computation of an N×N discrete Fourier transform (DFT) using polynomial transforms defined in modified rings of transforms according to claim 4, wherein the first multiplier means uses an FPGA configured as a radix-2 polynomial transform decimation-in-frequency butterfly.

6. An apparatus for computation of an N×N discrete Fourier transform (DFT) using polynomial transforms defined in modified rings of transforms according to claim 5, wherein the first multiplier means includes a look-up table external to the FPGA for storing multipliers.

7. An apparatus for computation of an N×N discrete Fourier transform (DFT) using polynomial transforms defined in modified rings of transforms according to claim 6, wherein the multipliers stored in the look-up table include complex constants $\sin(\pi n_2/N)$ and $\cos(\pi n_2/N)$.

8. An apparatus for computing multidimensional discrete Fourier transforms (DFTs) using a field programmable gate array (FPGA) comprising:

a. means for ordering a set of polynomial data in a multi-dimensional matrix;

b. first multiplier means for multiplying each element of the multi-dimensional matrix by $\omega^{-n_2}$ (where $\omega=e^{-j\pi/N}$, e is a constant (ln(e)=1, where ln indicates the natural logarithm), j=√−1, $n_2$=the column index number in the matrix, and N=the transform length) to produce a premultiplication product;

c. PT means for performing a polynomial transform (PT) on the premultiplication product to produce a fast polynomial transform (FPT) result;

d. reduced DFT means for performing N reduced DFTs of N terms on the FPT result to produce a permuted output;

e. reordering means for reordering the permuted output to a natural order.

9. An apparatus for computing multidimensional discrete Fourier transforms (DFTs) using a field programmable gate array (FPGA) according to claim 8, further comprising:

a. a first RAM buffer on an FPGA chip formed as part of the means for ordering;

b. a first latch on the FPGA chip for latching an output of the first RAM buffer;

c. a RAM lookup table as part of the multiplier means for storing as multipliers complex constants $\sin(\pi n_2/N)$ and $\cos(\pi n_2/N)$;

d. a second latch on the FPGA chip for latching the premultiplication product;

e. a second RAM buffer on the FPGA chip interposed between the PT means and the second latch for temporarily storing the premultiplication product as well as results of intermediate calculations of the PT means;

f. a radix-2 fast polynomial transform means on the FPGA chip as part of the PT means;

g. a third RAM buffer on the FPGA chip interposed between the PT means and the reduced DFT means for temporarily storing the results of intermediate calculations of the PT means and the reduced DFT means;

h. a fourth RAM buffer on the FPGA chip for temporarily storing the permuted output of the reduced DFT means while the reordering means reorders the permuted output to a natural order.

10. An apparatus for computing multidimensional discrete Fourier transforms (DFTs) using a field programmable gate array (FPGA) according to claim 9, further comprising $2\log_2 N$ virtual processors on the FPGA chip, wherein:

a. first through $\log_2 N$ virtual processors comprise the PT means and perform FPT butterfly ranks $0, \ldots \log_2-1$, respectively, wherein each of the first through $\log_2 N$ virtual processors implement one polynomial butterfly that is time division multiplexed to compute N/2 polynomial butterflies in a processing rank of the FTP;

b. $\log_2 N+1$ through $2\log N$ virtual processors comprise the reduced DFT means, wherein each of $\log_2 N+1$ through $2\log N$ virtual processors compute one of $\log_2 N$ butterfly ranks of an FFT algorithm and is a radix-2 FFT butterfly that is time division multiplexed over the N/2 butterflies in a single processing stage of the FFT.

* * * * *